(12) United States Patent
Matsumoto

(10) Patent No.: US 7,755,987 B2
(45) Date of Patent: Jul. 13, 2010

(54) OPTICAL DISK REPLAY DEVICE

(75) Inventor: Masaki Matsumoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 648 days.

(21) Appl. No.: 11/702,647

(22) Filed: Feb. 6, 2007

(65) Prior Publication Data

US 2007/0183277 A1    Aug. 9, 2007

(30) Foreign Application Priority Data

Feb. 7, 2006    (JP)   ............... 2006-029978

(51) Int. Cl.
     *G11B 7/00*    (2006.01)
(52) U.S. Cl. .................................. 369/44.29
(58) Field of Classification Search ............... 369/44.29
See application file for complete search history.

(56) References Cited

U.S. PATENT DOCUMENTS 6,031,799 A *   2/2000   Hwang .................... 369/44.41
2001/0002893 A1*   6/2001   Ohshita et al. ........... 369/44.28

FOREIGN PATENT DOCUMENTS

| JP | 01125733 | 5/1989 |
| JP | 2003-123283 | 4/2003 |
| JP | 2005116056 | 4/2005 |
| JP | 2005-310257 | 11/2005 |

OTHER PUBLICATIONS

Japanese Office Action with English translation, dated May 20, 2008, in corresponding foreign application, 3 pp.

* cited by examiner

*Primary Examiner*—Joseph H Feild
*Assistant Examiner*—Nicholas Lee
(74) *Attorney, Agent, or Firm*—Pillsbury Winthrop Shaw Pittman, LLP

(57) ABSTRACT

An optical pickup irradiates laser light upon a track of an optical disk and receives light reflected therefrom. A tracking actuator shifts an objective lens of this optical pickup in a tracking direction. A tracking error signal detection circuit outputs a tracking error signal based upon the reflected light received by the optical pickup. A phase compensation circuit generates a tracking drive signal based upon the tracking error signal, and outputs this tracking drive signal to the tracking actuator. A balance compensation value calculation circuit calculates a balance compensation value for the tracking error signal according to the tracking drive signal outputted by the phase compensation circuit. And a balance compensation circuit adds this balance compensation value to the tracking error signal detected by the tracking error signal detection circuit, and inputs this compensated value to the phase compensation circuit.

3 Claims, 4 Drawing Sheets

RELATIONSHIP BETWEEN TD OUTPUT AND BALANCE AMOUNT OF CHANGE

RELATIONSHIP BETWEEN BALANCE COMPENSATION VALUE AND COMPENSATION AMOUNT

RELATIONSHIP BETWEEN BALANCE COMPENSATION VALUE AND TD OUTPUT

OPTICAL DISK REPLAY DEVICE

CROSS REFERENCE

This Nonprovisional application claims priority under 35 U.S.C. §119(a) on Patent Application No. 2006-29978 filed in Japan on Feb. 7, 2006, the entire contents of which are hereby incorporated by reference.

BACKGROUND OF THE INVENTION

The present invention relates to an optical disk replay device which replays information recorded upon an optical disk.

In an optical disk replay device, tracking servo for an optical pickup is performed according to a tracking error signal.

For example, when the objective lens shifts toward the inner side of a track upon the optical disk, then at this time, based upon a tracking error signal, the objective lens is shifted by the tracking servo towards the external side of the track. The tracking servo applies a tracking drive voltage to a tracking coil of a tracking actuator based upon the tracking error signal. By doing this, the objective lens is drive controlled so as to be kept in its normal position relative to the track. In other words, the tracking error balances is compensated so as to become zero.

As documents in which this type of technique is disclosed, Japanese Laid-Open Patent Publication 2003-123283 and Japanese Laid-Open Patent Publication 2005-310257 are cited.

However, when the objective lens shifts, the balance of the tracking error signal changes, since the positional relationship of the objective lens and the light receiving element deviates. With tracking servo control in which this balance change is ignored, there is the problem that drive control of the objective lens may not be performed adequately, and there is a possibility that tracking slippage may occur. In particular, since the balance characteristic during lens shifting is bad with a tracking error signal (PPTE) of the push-pull type, accordingly there has been the problem has arisen that this type of tracking slippage may occur frequently.

The present invention has been conceived in order to solve this type of problem, and takes as its objective to provide an optical disk replay device which is capable of enhancing the tracking accuracy for an optical pickup, by obtaining a relationship between a tracking error signal and a tracking drive signal.

SUMMARY OF THE INVENTION

According to the present invention, an optical pickup irradiates laser light upon a track upon the optical disk, and receives light reflected therefrom. A tracking actuator shifts an objective lens of this optical pickup in a tracking direction. A tracking error signal detection circuit outputs a tracking error signal based upon the reflected light received by the optical pickup. And a phase compensation circuit generates a tracking drive signal based upon the tracking error signal, and outputs this tracking drive signal to the tracking actuator.

Furthermore, a balance compensation value calculation circuit calculates a balance compensation value for the tracking error signal according to the tracking drive signal outputted by the phase compensation circuit. And a balance compensation circuit adds this balance compensation value to the tracking error signal detected by the tracking error signal detection circuit, and inputs this compensated value to the phase compensation circuit.

Accordingly, the balance value of the tracking error signal is compensated according to the shifting of the objective lens by the tracking drive signal. By doing this, drive control of the objective lens is adequately performed even when the objective lens is shifted by the tracking drive signal and the balance of the tracking error signal has changed, so that tracking slippage is suppressed.

It would also be acceptable, during an adjustment process upon start up, actually to measure the slope $\alpha$ which specifies the relationship between the tracking drive signal and the balance amount of change of the tracking error signal, and the slope $\gamma$ which specifies the relationship of the balance compensation amount with respect to the balance compensation value of the tracking error signal, and to determine a balance compensation value $\beta$ to be outputted for the tracking drive signal which is outputted based thereupon. If a balance compensation value is determined in this manner based upon the actually measured values during start up, then it is possible to perform appropriate balance compensation.

Furthermore, it would also be acceptable, when actually measuring these slopes $\alpha$ and $\gamma$, to arrange to input various positive and negative actuation amounts including zero, and to measure the control amounts corresponding thereto. When this is done, it is possible to perform appropriate drive control of the objective lens, even if the characteristics thereof are different during actuation towards the positive side and during actuation towards the negative side.

DETAILED DESCRIPTION OF THE INVENTION

Figure 1:
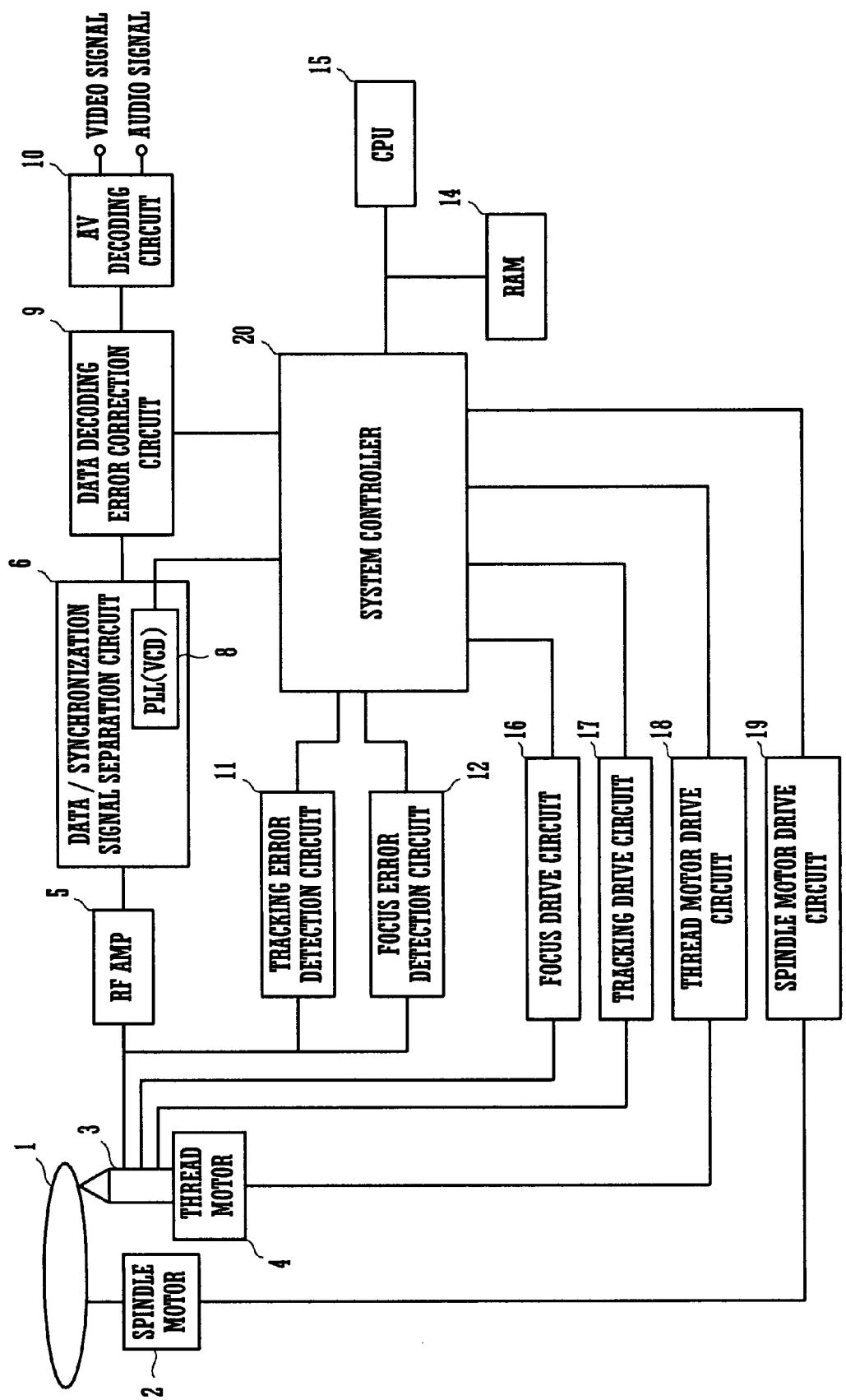
FIG. 1 is a block diagram showing the structure of an optical disk replay device according to an embodiment of the present invention.

FIG. 1 is a block diagram showing the structure of an optical disk replay device according to an embodiment of the present invention. This optical disk replay device comprises a spindle motor 2, an optical pickup 3, a thread motor 4, a focus drive circuit 16, a tracking drive circuit 17, a thread motor drive circuit 18, and a spindle motor drive circuit 19. The spindle motor 2 rotates the optical disk 1. Along with emitting laser light for replaying information recorded upon the optical disk 1, the optical pickup 3 receives light reflected from the optical disk 1. The thread motor 4 shifts the optical pickup 3 in the radial direction of the optical disk 1. The focus drive circuit 16 drives an actuator which performs focus servo for the optical pickup 3. The tracking drive circuit 17 drives a tracking actuator (not shown in the figures) which performs tracking servo for the optical pickup 3. And the thread motor drive circuit 18 drives the thread motor 4.

Furthermore, this optical disk replay device comprises an RF amp 5, a data/synchronization signal separation circuit 6, a data decoding error correction circuit 9, and an AV decoding circuit 10. During replay of the optical disk 1, the RF amp 5 inputs a replay signal (a read signal) from the optical disk 1 and creates and amplifies an RF signal with this replay signal. The data/synchronization signal separation circuit 6 comprises a PLL (Phase Locked Loop) circuit 8 which includes a VCO (Voltage Controlled Oscillator), and inputs the RF signal from the RF amp 5 and separates it into data and a synchronization signal. The data decoding error correction circuit 9 inputs the data which has thus been separated by the data/synchronization separation circuit 6, performs error checking upon this data by decoding it, performs error correction if there is an error in this data, and outputs the data. And the AV decoding circuit 10 outputs a video signal and an audio signal.

Furthermore, this disk replay device comprises a tracking error detection circuit 11 which detects a tracking error signal (PPTE) which is included in the replay signal from the optical pickup 3, and a focus error detection circuit 12 which detects a focus error signal which is included in the replay signal from the optical pickup 3.

Moreover, this optical disk replay device comprises a system controller 20 which controls the various structural elements described above with a CPU 15 which performs processing for the device as a whole. This system controller 20:

(1) performs control for servo focus of the optical pickup 3 based upon the focus error signal which is included in the replay signal from the optical pickup 3;

(2) performs control for servo tracking of the optical pickup 3 based upon the tracking error signal which is included in the replay signal from the optical pickup 3;

(3) performs control for driving the thread motor 4 via the thread motor drive circuit 18, so as to shift the optical pickup 3 in the radial direction of the optical disk 1;

(4) performs control via the spindle motor drive circuit 19 for rotating the spindle motor 2;

and the like.

The optical pickup 3 is mounted upon the thread motor 4. A lens holder in which an objective lens of this optical pickup is mounted is supported so as to be freely movable by the tracking actuator, so as to be moved by the thread motor 4 in the radial direction of the optical disk 1 (i.e. in the tracking direction). The tracking actuator shifts the lens holder in the tracking direction via a tracking drive voltage TD which is supplied from the tracking drive circuit 17. The system controller 20 determines a value for this tracking drive voltage TD based upon the tracking error signal which is outputted from the tracking error detection circuit 11, and commands the tracking drive circuit 17 to generate this tracking drive voltage TD. The above completes the explanation of the tracking servo control.

Figure 2:
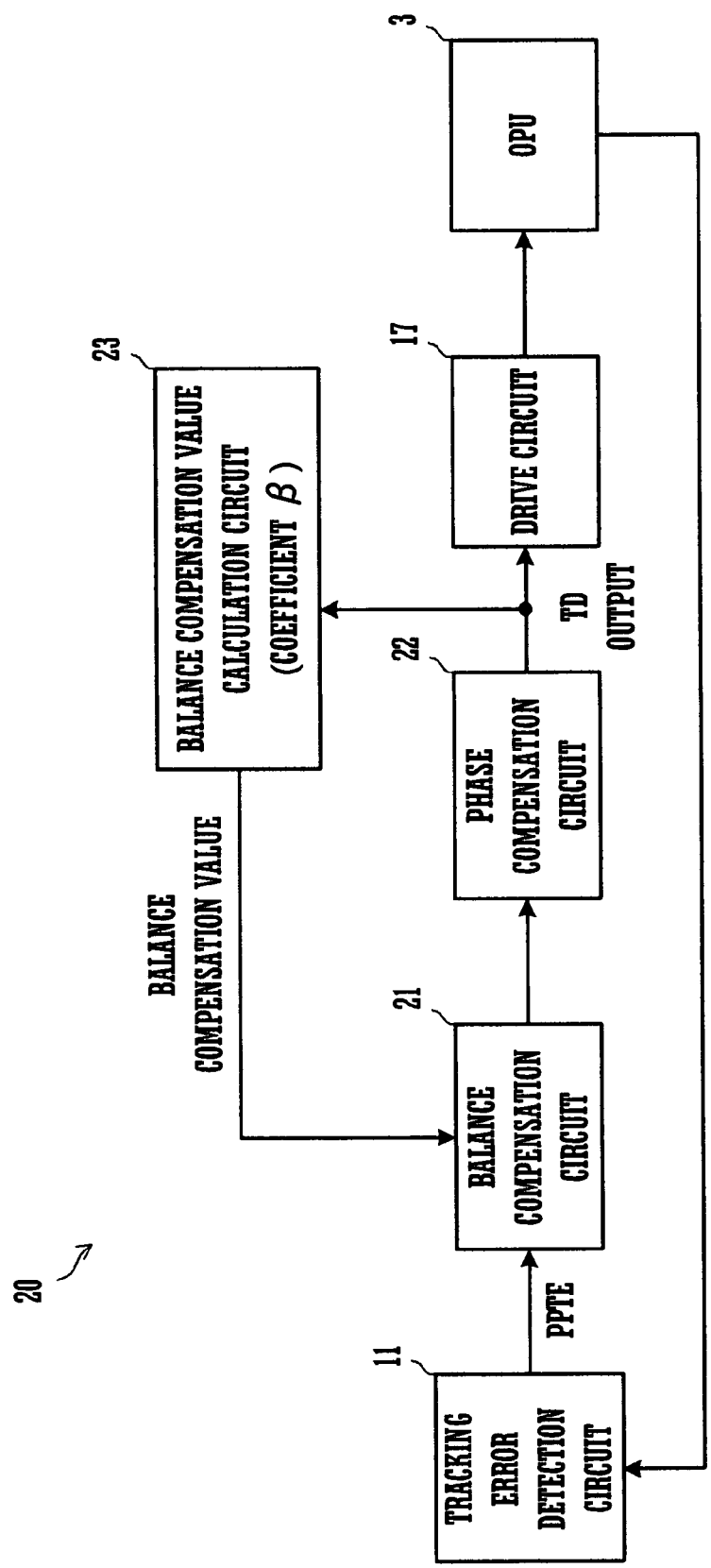
FIG. 2 is a block diagram showing a tracking control system of this optical disk replay device.

FIG. 2 is a figure showing the tracking control system, which comprises the tracking error detection circuit 11, the system controller 20, the tracking drive circuit 17, and the optical pickup 3. The system controller 20 comprises a balance compensation circuit 21, a phase compensation circuit 22, and a balance compensation value calculation circuit 23. The tracking error signal detected by the tracking error detection circuit 11 is inputted to the system controller 20. And the system controller 20 creates the tracking drive signal TD according to the detected value of this tracking error signal, and outputs it to the tracking drive circuit 17. This tracking drive signal TD is generated by the phase compensation circuit 22, which is a functional structure within the system controller 20. The tracking drive circuit 17 generates a voltage according to this tracking drive circuit TD and drives the tracking actuator, thereby shifting the objective lens of the optical pickup 3 in the tracking direction.

Here, when for tracking servo the tracking actuator is driven and the objective lens is shifted, the positional relationship between the optical axis of the objective lens and the light receiving element, which is divided into four sections, comes to deviate, so that the state of balance of the tracking comes to deviate from the position in which the tracking error signal is zero. Thus the system controller 20 functionally comprises the balance compensation value calculation circuit 22 which, when the objective lens is shifted due to the tracking drive signal TD, generates a balance compensation value according to the value of the tracking drive signal TD for correcting the balance change of the tracking error signal due to this shifting, and the balance compensation circuit 21 which adds this balance compensation value to the tracking error signal.

The balance compensation circuit 21 adds the balance compensation value to the tracking error signal PPTE which has been detected by the tracking error detection circuit 11, and thereby compensates the balance change of the tracking error signal. The balance compensation circuit 21 outputs this tracking error signal which has thus been compensated to the phase compensation circuit 22. The phase compensation circuit 22 generates the tracking drive signal TD based upon this tracking error signal which has thus been compensated. Along with this tracking drive signal TD being outputted to the tracking drive circuit 17, it is also inputted to the balance compensation value calculation circuit 23. The balance compensation value calculation circuit 23 calculates a balance compensation value based upon this tracking drive signal TD which has been inputted, and outputs this balance compensation value to the balance compensation circuit 21.

With the optical disk replay device having the structure described above, in the adjustment process when the system starts up, the system controller 20 performs PPTE balance setting processing in order to determine the balance compensation value corresponding to the tracking drive signal TD.

Figure 3:
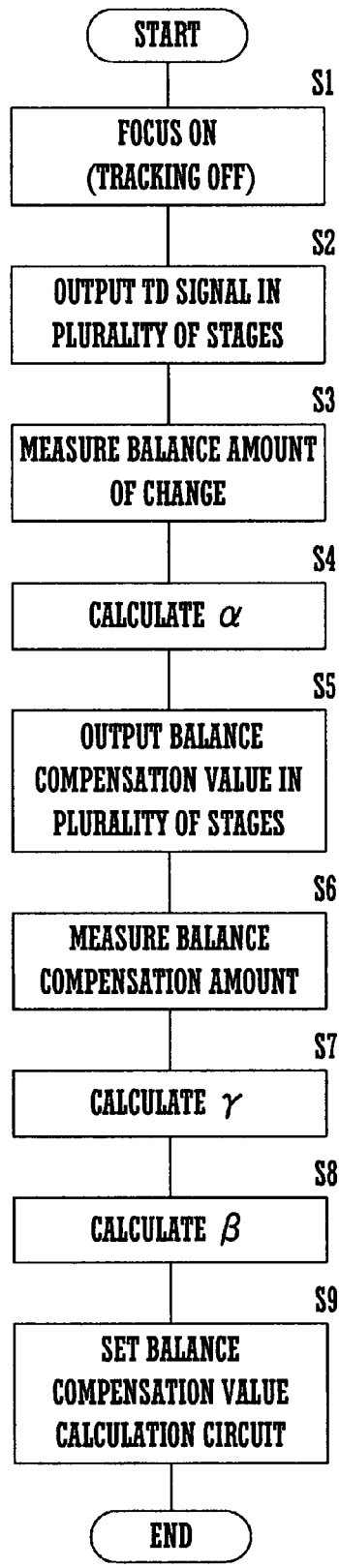
FIG. 3 is a flow chart showing the operation of a system controller of this optical disk replay device.
Figure 4A:
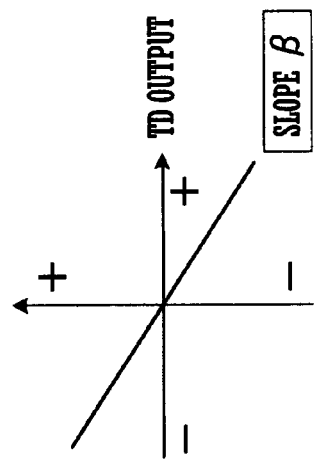
FIG. 4 is a figure for explanation of the relationship between a tracking drive signal TD of this optical disk replay device and a PPTE balance compensation value.
Figure 4B:
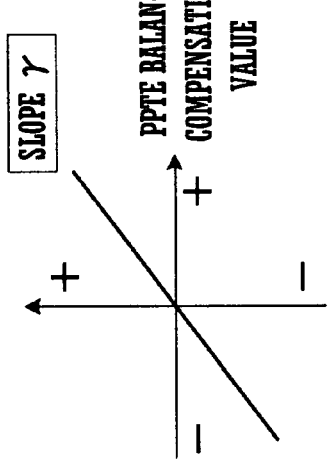
Figure 4C:
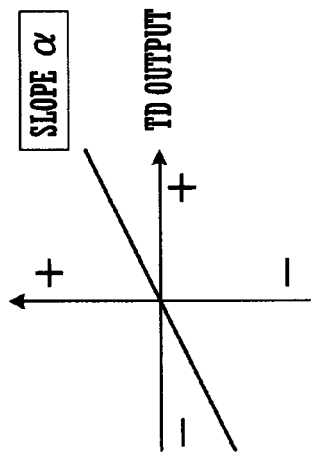

The PPTE balance setting processing will now be explained with reference to the flow chart of FIG. 3 and the graph of FIG. 4.

First, in the state in which the optical disk is being rotated and the tracking is OFF, only the focus is turned ON (a step s1), and a command is issued (a step s2) to the tracking drive circuit 17 to apply the tracking drive voltage TD in a plurality of stages (for example, +30 mV, 0 V, −30 mV, and so on). The balance amount of change of the tracking error signal (PPTE) which is outputted corresponding to each of these tracking drive voltages TD is detected (a step s3). Then the slope α of the PPTE balance amount of change with respect to TD which has been detected in this manner is obtained (a step s4: refer to FIG. 4(A)). Next, various balance compensation values are outputted to the balance compensation value calculation circuit 23 (a step s5). This balance compensation value assumes a plurality of positive and negative values, including zero. From these balance compensation values, it is detected to what extent the balance of the tracking error signal should be compensated (a step s6). Then the slope γ of the PPTE balance compensation amount with respect to the PPTE balance compensation value which has been detected in this manner is obtained (a step s7: refer to FIG. 4(B)). Next, from the slope α and the slope γ which have been detected in this manner, the slope β of the primary function for calculating the PPTE balance compensation value which must be generated corresponding to the TD output is obtained (a step s8: refer to FIG. 4(C)). However, β=−α/β.

And this inclination β which has thus been calculated is set to the balance compensation value calculation circuit 23 (a step s9).

This processing may be performed only when the system starts up; or it would also be acceptable for it to be performed every time an optical disk is loaded into the optical disk replay device.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. An optical disk replay device, comprising:
   an optical pickup which irradiates laser light upon a track of an optical disk and receives light reflected therefrom;
   a tracking actuator for shifting an objective lens of the optical pickup in a tracking direction;
   a tracking error signal detection circuit which outputs, a push-pull tracking error signal based upon the reflected light received by the optical pickup;
   a phase compensation circuit which generates a tracking drive signal corresponding to the push-pull tracking error signal and outputs the tracking drive signal to the tracking actuator; and
   a system controller which measures a balance amount of change of the push-pull tracking error signal relative to a voltage value of the tracking drive signal, measures a balance compensation amount of the push-pull tracking error signal relative to a balance compensation value, and obtains, on a condition that the balance amount is equal to the balance compensation amount, a slope $\beta$ which represents a ratio between balance compensation value and the voltage value of the tracking drive signal,
   wherein the system controller comprises:
   a balance compensation value calculation circuit which calculates, by using the slope $\beta$, a balance compensation value for the push-pull tracking error signal relative to the tracking drive signal outputted by the phase compensation circuit;
   a balance compensation circuit which compensates, by using the balance compensation value calculated by the balance compensation value calculation circuit, the push-pull tracking error signal detected by the tracking error signal detection circuit, and inputs this compensated push-pull tracking error signal to the phase compensation circuit; and
   the phase compensation circuit which generates the tracking drive signal based up on the push-pull tracking error signal compensated by the balance compensation circuit.

2. The optical disk replay device according to claim 1, further comprising a system controller which, during an adjustment process upon start up, measures a balance amount of change $\alpha$ of the push-pull tracking error signal relative to the tracking drive signal and measures a balance compensation amount $\gamma$ of the push-pull tracking error signal relative to the balance compensation value, and, based upon this balance amount of change $\alpha$ and balance compensation amount $\gamma$, determines a balance compensation value which is to be output to the tracking drive signal.

3. An optical disk replay device according to claim 2, wherein the measurement of the balance amount of change $\alpha$ is performed by outputting the tracking drive signal in a plurality of positive and negative stages including zero, and the measurement of the balance compensation amount $\gamma$ is performed by outputting the balance compensation value in a plurality of positive and negative stages including zero.

* * * * *